(12) United States Patent
Tonkovich et al.

(10) Patent No.: US 6,616,909 B1
(45) Date of Patent: Sep. 9, 2003

(54) METHOD AND APPARATUS FOR OBTAINING ENHANCED PRODUCTION RATE OF THERMAL CHEMICAL REACTIONS

(75) Inventors: Anna Lee Y. Tonkovich, Pasco, WA (US); Yong Wang, Richland, WA (US); Robert S. Wegeng, Richland, WA (US); Yufei Gao, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/492,246

(22) Filed: Jan. 27, 2000

Related U.S. Application Data

(63) Continuation-in-part of application No. 09/123,779, filed on Jul. 27, 1998, now Pat. No. 6,540,975.

(51) Int. Cl.[7] .............................. C01B 3/24; C01B 3/26; C01B 3/16; C07C 27/06; C07C 5/00

(52) U.S. Cl. .................... 423/648.1; 423/651; 423/652; 423/655; 423/656; 423/659; 518/728; 585/250

(58) Field of Search .............................. 423/648.1, 650, 423/651, 652, 655, 656, 659; 518/728; 585/250

(56) References Cited

U.S. PATENT DOCUMENTS

| | | | | |
|---|---|---|---|---|
| 3,145,238 A | * | 8/1964 | Kestner | 260/672 |
| 4,065,379 A | * | 12/1977 | Soonawala et al. | 208/67 |
| 4,196,099 A | | 4/1980 | Hunter et al. | 252/437 |
| 4,422,961 A | | 12/1983 | Gray | 502/301 |
| 4,801,620 A | | 1/1989 | Fujitani et al. | 518/715 |
| 4,806,427 A | | 2/1989 | Stein et al. | 502/60 |
| 4,935,392 A | | 6/1990 | Kainer et al. | 502/60 |
| 4,945,116 A | | 7/1990 | Abrevaya | 518/715 |
| 4,985,230 A | | 1/1991 | Baden et al. | 423/650 |

(List continued on next page.)

FOREIGN PATENT DOCUMENTS

| | | | |
|---|---|---|---|
| EP | 0 869 842 | 10/2001 | ........................ 8/2 |
| WO | WO 90/07377 | 7/1990 | .................... 23/89 |
| WO | WO 98/38147 | 9/1998 | ........................ 1/4 |
| WO | WO 00/06295 | 2/2000 | ........................ 8/2 |
| WO | WO 01/12312 | 2/2001 | |
| WO | WO 01/12753 | 2/2001 | |
| WO | WO 01/96234 | 12/2001 | ...................... 3/38 |

OTHER PUBLICATIONS

Pestryakov, A.N. et al., "Foam Metal Catalysts with Intermediate Support For Deep Oxidation of Hydrocarbons", Jun. 8, 1994, React. Kinet. Catal., vol. 53, No. 2, pp. 347–352.*

Hagendorf, U. "*A Pt/Al$_2$O$_3$ Coated Microstructured Reactor/Heat Exchanger for the Controlled H$_2$ / O$_2$ –Reaction in the Explosion Regime.*" p. 81–87. 1997.

Mulder, A. "*Catalytic Combustion in a Sintered Metal Reactor With Integrated Heat Exchanger.*" p. 825–836. 1997.

Research Disclosure "Full Range Liquid Level Sensor", p. 32356. 1991.

*Primary Examiner*—Wayne A. Langel
*Assistant Examiner*—Jonas N. Strickland
(74) *Attorney, Agent, or Firm*—Frank Rosenberg; Stephen R. May

(57) ABSTRACT

Reactors and processes are disclosed that can utilize high heat fluxes to obtain fast, steady-state reaction rates. Porous catalysts used in conjunction with microchannel reactors to obtain high rates of heat transfer are also disclosed. Reactors and processes that utilize short contact times, high heat flux and low pressure drop are described. Improved methods of steam reforming are also provided.

63 Claims, 8 Drawing Sheets

U.S. PATENT DOCUMENTS

| | | | |
|---|---|---|---|
| 5,023,276 A | 6/1991 | Yarrington et al. | 514/703 |
| 5,227,407 A | 7/1993 | Kim | 518/700 |
| 5,364,824 A * | 11/1994 | Andrews et al. | 502/209 |
| 5,461,022 A | 10/1995 | Dosch et al. | 502/242 |
| 5,725,756 A * | 3/1998 | Subramaniam et al. | 208/48 R |
| 5,811,062 A * | 9/1998 | Wegeng et al. | 422/129 |
| 6,126,723 A * | 10/2000 | Drost et al. | 96/4 |
| 6,168,765 B1 | 1/2001 | Romatier et al. | 422/200 |
| 6,211,255 B1 | 4/2001 | Schanke et al. | 518/715 |
| 6,228,341 B1 | 5/2001 | Hebert et al. | 423/352 |
| 6,274,101 B1 | 8/2001 | Sechrist | 422/198 |
| 6,479,428 B1 * | 11/2002 | Tonkovich et al. | 502/302 |
| 6,488,838 B1 * | 12/2002 | Tonkovich et al. | 208/108 |

* cited by examiner

METHOD AND APPARATUS FOR OBTAINING ENHANCED PRODUCTION RATE OF THERMAL CHEMICAL REACTIONS

RELATED APPLICATIONS

This application is a continuation-in-part of U.S. Ser. No. 09/123,779 filed Jul. 27, 1998, now U.S. Pat. No. 6,540,975, which are incorporated by reference.

This invention was made with Government support under Contract DE-AC0676RLO1830 awarded by the U.S. Department of Energy. The Government has certain rights in the invention.

FIELD OF THE INVENTION

The present invention relates to a method and apparatus for thermal chemical reactions. The method and apparatus can provide an enhanced reaction rates for thermal chemical reactions.

BACKGROUND OF THE INVENTION

Thermal chemical reactions are those chemical reactions that produce (exothermic) or consume (endothermic) heat. Examples of thermal chemical reactions include hydrocarbon conversion reactions such as steam reforming, water-gas shift reactions and combustion. These well-known reactions are usually carried out in the presence of a catalyst at temperatures up to about 1300° C. Because the intrinsic kinetics of a thermal chemical reaction can be much faster than the heat transfer rate between the reaction vessel and the thermal sink, source or environment, the actual rate of product production (i.e., the observed rate) is slower than the intrinsic rate. Intrinsic kinetics means the rate at which products could theoretically be formed at the catalyst surface.

Limited production rates may result from longer residence time which is typically seconds to minutes in conventional thermal chemical reaction vessels. As it is conventionally defined, residence time is equal to the volume of the reaction zone divided by the inlet volumetric flow rate of reactants at the reaction system's temperature and pressure. The reaction zone is the total volume of the catalyst and surrounding area through which reactants and products flow.

An example of these limited production rates can be seen in the water gas shift reaction which is conventionally carried out in fixed bed reactors. In the water gas shift reaction, carbon monoxide and water are converted to carbon dioxide and hydrogen. Conventionally, this reaction suffers from multiple-second residence times (a kinetic impediment) when carried out in fixed bed reactors. Theoretical kinetics suggests that residence times on the order of milliseconds could, theoretically, be obtained. There are two kinetic retarding aspects to conventional reactors. The first is a diffusion limitation as reactants diffuse into and out of a catalyst-bearing porous pellet and the second is a heat transfer limitation which is a combination of heat transfer parameters (thermal conductivity and length) of catalyst supports and overall reactor geometry (shape, size, and distance to the external heat exchanger). Because the water gas shift reaction is critical to a multi-reactor fuel processing system that supports distributed energy production through the use of a fuel cell, there is a need for a smaller, faster water gas shift reactor.

Another example of a thermal chemical reaction is in the conventional methane steam reforming reactor which produces synthesis gas at an average residence time of several seconds and with an effectiveness factor of 0.01 to 0.05 as reported by Adris, A., Pruden, B., Lim, C., J. Grace, 1996, "On the reported attempts to radically improve the performance of the steam methane reforming reactor," Canadian Journal of Chemical Engineering, 74, 177–186. In a typical industrial operation, the methane to steam ratio is run at 3:1 to prevent coke formation. Efforts to improve heat transfer between the reaction vessel for this endothermic reaction and the thermal source have made only modest improvements in product production rate.

Thermal reactions have long been, and continue to be, conducted in huge volumes on production scales requiring very large capital investments, typically greater than $100 million. Not surprisingly, there have been extensive efforts, over a long period of time, aimed at improving the speed and efficiency of these reactions. Despite these attempts, there remains a need for a method and apparatus that increase the heat transfer rate between the reaction vessel and the thermal sink or source and thereby approach the theoretical intrinsic kinetic rate of reaction and production.

SUMMARY OF THE INVENTION

The present invention provides methods and apparatuses for obtaining an enhanced production rate per reaction chamber volume of a reaction chamber with an inlet and an outlet for a thermal chemical reaction, wherein a ratio of the enhanced production rate per reaction chamber volume to a conventional production rate per conventional reaction chamber volume for the thermal chemical reaction is at least 2. For example, for conventional steam reforming, residence time is on the order of seconds whereas with the present invention, residence time is less by a factor of 2, on the order of milliseconds to tens or hundreds of milliseconds. In one aspect, the invention includes:

(a) a porous insert within the reaction chamber volume, wherein a reactant flow substantially completely passes through the porous insert wherein the reaction chamber volume with the porous insert has a mean porosity less than 1 and a mass transport distance of reactants to a catalyst site of no greater than 3 mm;

(b), the reaction chamber volume with a length parallel to a bulk reactant flow, the length less than or equal to 6 inches, and with a height (a thermal distance from the heat sink to the heat source) less than or equal to 2 inches, thereby transferring reaction heat at an enhanced heat transfer rate through the porous insert; and (c) a heat transfer chamber in thermal contact with the, reaction chamber volume, serving as a heat sink or heat source, the heat transfer chamber transferring heat at said enhanced heat transfer rate across a wall between the heat transfer chamber and the reaction chamber, thereby obtaining the enhanced production rate per reaction chamber volume for the thermal chemical reaction wherein a ratio of the enhanced production rate per reaction chamber volume to a conventional production rate per conventional reaction chamber volume for the thermal chemical reaction is at least 2.

These features have been found to cooperate with the reaction kinetics in terms of transferring heat at a rate sufficient to avoid substantial impediment of the kinetics. These features are effective for both catalytic and non-catalytic thermal chemical reactions. For catalytic chemical reactions, addition of a thin catalyst layer (<150 microns, μm, more preferably less than 50 μm) upon the porous insert substantially reduces the diffusion pathways of reactants to catalyst sites compared with more severe limitations of reactant diffusion within ceramic pellets (>1 mm) as in conventional systems. Thus, according to the present invention, for catalytic thermal chemical reactions, both kinetic impediments are substantially reduced permitting realization of theoretical or near theoretical reaction kinetics. More specifically, a water gas shift reactor made according to the present invention has $\frac{1}{10}^{th}$ to $\frac{1}{100}^{th}$ the size of conventional processing hardware for the same production output.

The present invention further provides a method and apparatus (vessel) for providing a heat transfer rate from a reaction chamber through a wall to a heat transfer chamber (exothermic reaction) or providing heat from a heat transfer chamber through a wall to a reaction chamber (endothermic reaction) substantially matching a local heat transfer requirement of a catalytic thermal chemical reaction. An important aspect of this invention is the thermal distance defined on a cross sectional plane through the vessel inclusive of a heat transfer chamber, reaction chamber and a wall between the chambers. The cross sectional plane is perpendicular to a bulk flow direction of the reactant stream, and the thermal distance is a distance between a coolest position and a hottest position on the cross sectional plane. The thermal distance is of a length wherein the heat transfer rate from (or to) the reaction chamber to (or from) a heat transfer chamber (heat exchanger) substantially matches the local heat transfer rate.

The invention includes a process for the catalytic conversion of at least one reactant in a thermal chemical reaction, in which at least one reactant is passed into at least one reaction chamber; heat is transferred to or from the reaction chamber into at least one heat exchanger; and at least one product is obtained. The reaction chamber contains a catalyst that catalyzes; the reaction of the reactant or reactants. In preferred embodiments, the process has one or more of the following characteristics: at steady state, at least 0.6 W/(cc of total reactor volume) of heat is transferred, where total reactor volume is defined as the sum of the volume of the reaction chamber(s) and heat exchanger chamber(s) including the volume of chamber walls; the contact time of the reactant with the catalyst is less than about 0.3 seconds; and the pressure drop through the reaction chamber is less than about 15 psig.

One example of a thermal chemical reaction that can be conducted using methods and reactors of the present invention is steam reforming of a hydrocarbon. In this process a feed stream comprising hydrocarbon gas and steam is passed into a reaction chamber which contains a catalyst that catalyzes the reaction of hydrocarbon gas and steam to produce a gaseous mixture comprising at least carbon monoxide and hydrogen gas. This process can produce more than 0.01 SLPM of hydrogen gas per cubic centimeter of total reactor volume.

The present invention also provides a reactor for the catalytic conversion of at least one reactant in a thermal chemical reaction, comprising: at least one reaction chamber containing a porous catalyst insert; and at least one heat exchanger that is in thermal contact with the reaction chamber. The reaction chamber has a length less than or equal to 6 inches and a height less than or equal to 2 inches. The porous catalyst insert comprises a porous metal foam having open cells ranging from about 20 ppi to about 3000 ppi.

The invention also includes a reactor in which the reaction chamber has a height less than or equal to 2 inches; and wherein at least one heat exchanger and at least one reaction chamber are configured such that, during steady-state operation, at least 0.6 W of heat per cc of total reactor volume can be transferred between the heat exchanger and the reaction chamber.

The invention also includes a process for the catalytic conversion of at least one reactant in a thermal chemical reaction in which at least one reactant is passed into at least one reaction chamber that contains a catalyst that catalyzes the reaction of the at least one reactant; transferring heat to or from said at least one reaction chamber from or into said at least one heat exchanger; and obtaining at least one product from the reaction chamber; where the step of transferring heat, at steady-state, transfers at least 0.6 W of heat per cc of total reactor volume, such that, at steady state, the catalyst is maintained within a temperature range that reduces the formation of at least one undesirable chemical reaction product. Alternatively, the formation of undesirable chemical product(s) can be reduced by utilizing a contact time of less than about 0.3 seconds, thereby suppressing slow reactions that may form an undesirable chemical reaction product. Undesired chemical products can result from secondary reactions or slow parallel reactions. In the water-gas shift reaction, desirable products include carbon dioxide and water, and an undesirable product is methane. In steam reforming of a hydrocarbon, desirable products include hydrogen and carbon monoxide and/or carbon dioxide, and an undesirable product is coke.

The subject matter of the present invention is particularly pointed but and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1A:
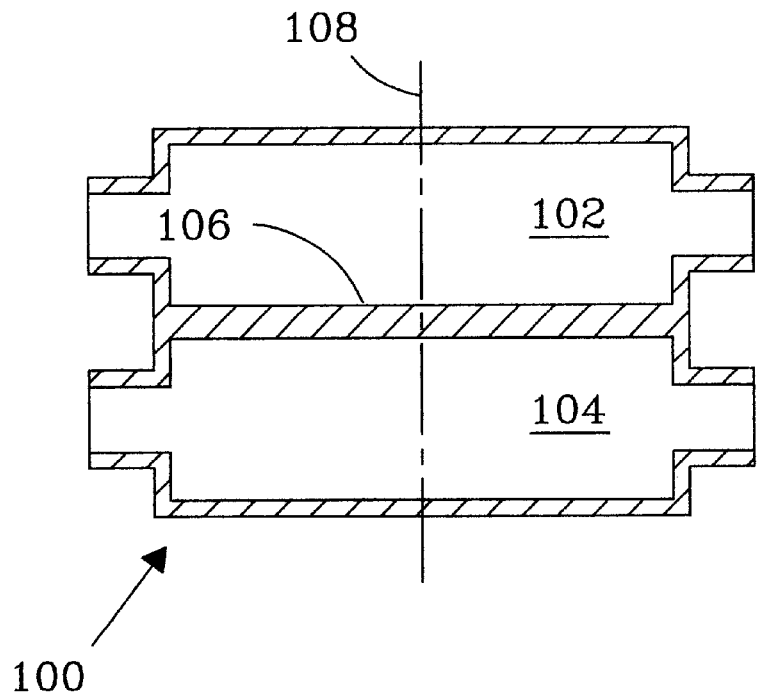
FIG. 1a is a cross section of a stacked reaction chamber with heat exchanger chamber.
Figure 1B:
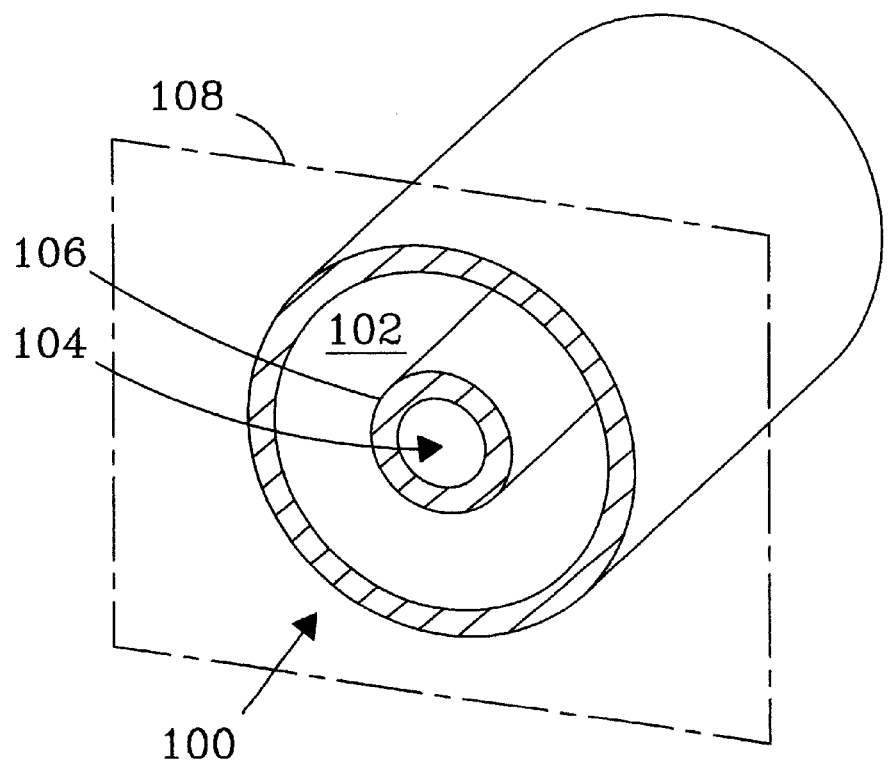
FIG. 1b is an isometric of a nested reaction chamber with heat exchanger chamber.

Referring to FIGS. 1a and 1b, a vessel 100 for thermal chemical reactions having two chambers 102 and 104 with a wall 106 therebetween. Either of the two chambers 102, 104 may be the reaction chamber. Bulk flow of reactants within the reaction chamber 102 is substantially perpendicular to a cross section plane 108. The vessel 100 may have stacked chambers as in FIG. 1a or nested chambers as in FIG. 1b. The reaction in the reaction chamber may be endothermic or exothermic.

In a thermal chemical reaction, the steady-state rate of production (reaction kinetics) is limited by the rate of heat transfer either to (endothermic) or from (exothermic) the reaction site. In the case of exothermic reactions, low rates of heat removal may promote undesired side reactions, or cause thermal hot spots or thermal runaway in the reactor. Commercial exothermic reactors are often operated with low conversion per pass to prevent hot spots and thermal excursions. Enhanced heat removal would safely permit operating at a higher production rate per unit reactor hardware volume. In order to obtain an enhanced heat transfer rate and thereby an enhanced production rate, the reaction chamber preferably has a porous insert (not shown) within the reaction chamber volume wherein the porous insert within the reaction chamber volume has a mean porosity less than 1, a transport distance of the reactant(s) to the catalyst site no greater than 3 mm, and a height (a thermal transport distance from heat source to heat sink, no greater than 2 inches, thereby transferring reaction heat at an enhanced heat transfer rate through the porous insert.

The porous insert may be a powder, a porous monolith (including but not limited to metal or ceramic foam, felt, honeycomb, tube bank, stacked microchannel assembly, and combinations thereof), fibers, wad (e.g. steel wool), or combinations thereof. In view of the cost of replacing spent catalyst, for catalytic reactors, it is preferred that the porous insert be removable from the reaction chamber. The porous insert may be arranged to provide single or multiple flow passages for reactants through the reaction chamber volume.

Preferably, the reaction chamber volume has a length parallel to a bulk reactant flow, the length less than or equal to 6 inches, and has a height, a thermal distance from heat sink to heat source, less than or equal to 2 inches. The limited length and height provide short distances permitting faster heat transfer. Moreover, the short length reduces overall pressure drop through the reaction chamber.

The heat transfer chamber (heat exchanger) is in thermal contact with the reaction chamber volume, the heat transfer chamber transferring heat at the enhanced heat transfer rate across the wall 106 between the heat transfer chamber and the reaction chamber, thereby obtaining the enhanced production rate per reaction chamber volume for the thermal chemical reaction.

For catalytic thermal chemical reactions, a preferred catalyst has a porous support, a solution deposited interfacial layer thereon, and a catalyst material on the interfacial layer. A more preferred catalyst has a porous support, a buffer layer, an interfacial layer, and a catalyst material. Any layer may be continuous or discontinuous as in the form of spots or dots, or in the form of a layer with gaps or holes.

The porous support may be a porous ceramic or a metal foam. Other porous supports suitable for use in the present invention include carbides, nitrides, and composite materials. Prior to depositing the layers, the porous support has a porosity of at least 5% as measured by mercury porosimetry and an average pore size (sum of pore diameters/number of pores) of from 1 μm to 1000 μm as measured by optical and scanning electron microscopy. Preferably, the porous support has a porosity of about 30% to about 99%, more preferably 60% to 98%. Preferred forms of porous supports are foams, felts, wads and combinations thereof. Foam is a structure with continuous walls defining pores throughout the structure. Felt is a structure of fibers with interstitial spaces therebetween. Wad is a structure of tangled strands, like steel wool. Less preferably, porous supports may also include other porous media such as pellets and honeycombs, provided that they have the aforementioned porosity and pore size characteristics. The open cells of a metal foam preferably range from about 20 pores per inch (ppi) to about 3000 ppi and more preferably about 20 to about 1000 ppi, still more preferably about 40 to about 120 ppi. PPI is defined as the largest number of pores per inch (in isotropic materials the direction of the measurement is irrelevant; however, in an isotropic materials, the measurement is done in the direction that maximizes pore number). In the present invention, ppi is measured by scanning electron microscopy. It has been discovered that a porous support provides several advantages in the present invention including low pressure drop, enhanced thermal conductivity over conventional ceramic pellet supports, and ease of loading/unloading in chemical reactors.

The buffer layer, if present, has different composition and/or density than both the support and the interfacial layers, and preferably has a coefficient of thermal expansion that is intermediate the thermal expansion coefficients of the porous support and the interfacial layer. Preferably, the buffer layer is a metal oxide or metal carbide. Applicants discovered that vapor-deposited layers are superior because they exhibit better adhesion and resist flaking even after several thermal cycles. More preferably, the buffer layer is $Al_2O_3$, $TiO_2$, $SiO_2$, and $ZrO_2$ or combinations thereof. More specifically, the $Al_2O_3$ is $\alpha$-$Al_2O_3$, $\gamma$-$Al_2O_3$ and combinations thereof. $\alpha$-$Al_2O_3$ is more preferred because of its excellent resistance to oxygen diffusion. Therefore, it is expected that resistance against high temperature oxidation can be improved with alumina coated on the porous support. The buffer layer may also be formed of two or more comppositionally different sublayers. When the porous support is metal, for example a stainless steel foam, a preferred embodiment has a buffer layer formed of two compositionally different sub-layers (not shown). The first sublayer (in contact with the porous support) is preferably $TiO_2$ because it exhibits good adhesion to the porous metal support. The second sublayer is preferably $\alpha$-$Al_2O_3$ which is placed upon the $TiO_2$. In a preferred embodiment, the $\alpha$-$Al_2O_3$ sublayer is a dense layer that provides excellent protection of the underlying metal surface. A less dense, high surface area interfacial layer such as alumina may then be deposited as support for a catalytically active layer.

Typically the porous support has a thermal coefficient of expansion different, from that of the interfacial layer. Accordingly, for high temperature catalysis (T>150° C.) a buffer layer is needed to transition between the two coefficients of thermal expansion. The thermal expansion coefficient of the buffer layer can be tailored by controlling the composition to obtain an expansion coefficient that is compatible with the expansion coefficients of the porous support and interfacial layers. Another advantage of the buffer layer is that it provides resistance against side reactions such as coking or cracking caused by a bare metal foam surface. For chemical reactions which do not require large surface area supports such as catalytic combustion, the buffer layer stabilizes the catalyst metal due to strong metal to metal-oxide interaction. In chemical reactions which require large surface area supports, the buffer layer provides stronger bonding to the high surface area interfacial layer. Preferably, the buffer layer is free of openings and pin holes—this provides superior protection of the underlying support. More preferably, the buffer layer is nonporous. The buffer layer has a thickness that is less than one half of the average pore size of the porous support. Preferably, the buffer layer is between about 0.05 and about 10 $\mu$m thick, more preferably, less than 5 $\mu$m thick. The buffer layer should exhibit thermal and chemical stability at elevated temperatures.

In some embodiments of the present invention, adequate adhesion and chemical stability can be obtained without a buffer layer, so the buffer layer can be omitted, thus saving cost, providing, extra volume and further enhancing heat transfer from the catalyst.

The interfacial layer can be comprised of nitrides, carbides, sulfides, halides, metal oxides, carbon and combinations thereof. The interfacial layer provides high surface area and/or provides a desirable catalyst-support interaction for supported catalysts. The interfacial layer can be comprised of any material that is conventionally used as a catalyst support. Preferably, the interfacial layer is a metal oxide. Examples of metal oxides include, but are not limited, to $\gamma$-$Al_2O_3$, $SiO_2$, $ZrO_2$, $TiO_2$, tungsten oxide, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. The interfacial layer may serve as a catalytically active layer without any further catalytically active material deposited thereon. Usually, however, the interfacial layer is used in combination with catalytically active layer. The interfacial layer may also be formed of two or more compositionally different sublayers. The interfacial layer has a thickness that is less than one half of the average pore size of the porous support. Preferably, the interfacial layer thickness ranges from about 0.5 to about 100 $\mu$m, more preferably from about 1 to about 50 $\mu$m. The interfacial layer can be either crystalline or amorphous and preferably has a BET surface area of at least 1 $m^2/g$.

The catalytically active material (when present) can be deposited on the interfacial layer. Alternatively, a catalytically active material can be simultaneously deposited with the interfacial layer. The catalytically active layer (when present) is typically intimately dispersed on the interfacial layer. That the catalytically active layer is "disposed on" or "deposited on" the interfacial layer includes the conventional understanding that microscopic catalytically active particles are dispersed: on the support layer (i.e., interfacial layer) surface, in crevices in the support layer, and in open pores in the support layer. The catalytically active layer may include: catalyst metals, including but not limited to, noble metal, transition metal and combinations thereof; metal oxides, including but not limited to, oxides of alkali elements, alkaline earth elements, boron, gallium, germanium, arsenic, selenium, tellurium, thallium, lead, bismuth, polonium, magnesium, titanium, vanadium, chromium, manganese, iron, nickel, cobalt, copper, zinc, zirconium, molybdenum, tin, calcium, aluminum, silicon, lanthanum series element(s), and combinations thereof; composites; zeolite(s); nitrides; carbides; sulfides; halides; phosphates; and combinations of any of the above.

In order to mitigate the mass transfer limitation of the catalyst structure, the catalyst impregnation preferably forms a porous interfacial layer having a depth less than 50 $\mu$m, preferably less than 20 $\mu$m. Therefore, the diffusion path length is at least a factor of 5 shorter than for standard catalyst particles. The thinner impregnated catalyst structure also enhances heat transfer, due to a shorter heat transfer pathway.

The catalyst structure maybe any geometric configuration. Preferably, the catalyst is a porous structure such as a foam, felt, wad and combinations thereof. The catalyst (including the support and catalytic material), preferably is sized to fit within a reaction chamber. The catalyst may be a single piece of porous contiguous material, or many pieces in physical contact. The catalyst is preferred to have contiguous material and contiguous porosity such that molecules can diffuse through the catalyst. In this preferred embodiment, the catalyst can be disposed in a reaction chamber such that gases will flow substantially through the catalyst (single or multiple pieces) rather than around it. In a preferred embodiment, the cross-sectional area of the catalyst occupies at least 80%, more preferably at least 95% of the cross-sectional area of the reaction chamber. In preferred embodiments, the catalytically active metal is distributed on surfaces throughout catalyst such that reactants passing through the catalyst can react anywhere along the passage through the catalyst; this is a significant advantage over pellet-type catalysts that have a large-volume of unused space or catalytically ineffectively used space in the pellet's interior. The porous catalyst is also superior over powders because packed powders may cause a severe pressure drop. The catalyst preferably has a surface area, as measured by BET, of greater than about 0.5 $m^2/g$, more preferably greater than about 2.0 $m^2/g$.

Catalysts of the present invention can also be characterized by the properties they exhibit. Factors that can be controlled to effect these properties include: selection of the porous support, buffer, interfacial, and catalytically active layers; gradation of thermal expansion coefficients, crystallinity, metal-support interactions, catalyst size, thermal conductivity of the support, porosity, thermal conductance from reaction chamber, deposition techniques and other factors as are apparent in view of the descriptions herein. Certain preferred embodiments of the catalysts of the present invention exhibit one or more of the following properties: adhesion—after 3 thermal cycles in air, the catalyst exhibits less than 2% (by area) of flaking as viewed by SEM (scanning electron microscope) analysis; oxidation resistance, conversion of reactant(s), contact/residence times, product selectivity, pressure drop and production rates.

A preferred method of making the inventive catalyst has the steps of selecting a porous support, depositing a buffer layer on the porous support and depositing an interfacial layer thereover. Optionally a catalyst layer may be deposited onto the interfacial layer or both the interfacial layer and the catalyst layer may be simultaneously deposited on the buffer layer.

Because metal has web surfaces that are nonporous and smooth, deposition of the buffer layer may be impeded. One way to mitigate this problem is to rough the metal surface via chemical etching. The adhesion of high surface area gamma-alumina supported metal catalysts to metal foam is significantly improved when metal foam is roughed via chemical etching using mineral acid solutions, for example 0.1 to 1M HCl. Roughed web surface also shows improved resistance to the spalling of catalyst layer under thermal cyclings. In a preferred embodiment, wherein a metal foam is used as the porous support, the metal foam is etched prior to vapor depositing the buffer layer. Etching is preferably with an acid, for example HCl.

Deposition of the buffer layer is preferably by vapor deposition including but not limited to chemical vapor deposition, physical vapor deposition or combinations thereof. Surprisingly, it has been found that vapor deposition, which is typically conducted at high temperatures, results in polycrystalline or amorphous phases that provide good adhesion of the buffer layer to the surface of the porous support. The method is particularly advantageous for adhering a metal oxide buffer layer to a metal porous support. Alternatively, the buffer layer may be obtained by solution coating. For example, the solution coating has the steps of metal surface functionalization via exposing the metal surface to water vapor to form suface hydroxyls, followed by surface reaction and hydrolysis of alkoxides to obtain a coating of metal oxide. This solution coating may be preferred as a lower cost method of depositing the buffer layer.

The interfacial layer is preferably formed by vapor or solution deposition using precursors as are known for these techniques. Suitable precursors include organometallic compounds, halides, carbonyls, acetonates, acetates, metals, colloidal dispersions of metal oxides, nitrates, slurries, etc. For example, a porous alumina interfacial layer can be wash-coated with PQ alumina (Nyacol Products, Ashland, Mass.) colloidal dispersion followed by drying in a vacuum oven overnight and calcining at 500° C. for 2 hours.

The catalytically active material can be deposited by any suitable method. For example, catalyst precursors can be deposited on colloidal metal oxide particles and slurry coated on a buffer-coated porous support, then dried and reduced.

Certain embodiments of the present invention can be characterized in terms of residence or contact time. These terms have well-defined meanings in the art. Contact time is the total volume of the catalyst chambers divided by the total flowrate (defined as F-total) of inlet reactants assuming they are an ideal gas corrected to standard conditions (i.e., the volume of the catalyst chamber/F-total at STP where STP is 273K and 1 atm). The volume of the catalyst chambers includes the volume in immediate proximity and surrounding the catalyst zone. As an example, if one were to pack one quarter of the channels with powders, then the volume of the catalyst chamber would only include that region where gas can flow and where it can contact the catalyst, i.e. only one quarter of the total channel volume would be included in this calculation. The volume of dead space, i.e., headers, footers, etc. is ignored in this calculation. Residence time (meaning average residence time) is the total volume of the catalyst chambers divided by the total flowrate of inlet reactants, corrected to the actual temperature and pressure of the reactants in the reactor (i.e., the volume of the catalyst chamber/F-total corrected to actual conditions). F-total at STP is the total volumetric flowrate of reactants (includes all reactants, and diluents if present). Inlet gases are typically metered with mass flow controllers set to standard conditions, i.e. the user presets the desired STP flowrate.

F-total corrected to actual conditions=F-total-STP×(Temperature in K)/273×1 atm/(P actual in atm): this value is used to calculate the residence time or the 'true time' within a reactor. Most practitioners prefer to use contact time, because it is a convenient method to keep the time variable fixed while stepping through 10 degree C. increments in reaction temperature etc.

The invention further provides a catalytic process comprising passage of at least one reactant into a reaction chamber comprising the inventive catalyst, conversion of said at least one reactant into at least one product, and passage of the product out of the reaction chamber. In a preferred embodiment, the catalytic process is conducted in an apparatus having microchannels. Microchannels have at least one dimension of about 1 mm or less. Examples of suitable microchannel apparatus and various process related factors are described in U.S. Pat. Nos. 5,611,214, 5,811,062, 5,534,328, 6,488,838, 6,451,864, 6,200,536, 6,479,428, 6,440,895, 6,129,973, and 6,192,596, all of which are incorporated by reference as if reproduced in full below. In another preferred embodiment, the catalyst is a monolith—a single contiguous, yet porous, piece of catalyst or several contiguous pieces that are stacked together (not a bed of packed powder or pellets or a coating on the wall of a microchannel) that can easily be inserted and extracted from a reaction chamber. The piece or stack of catalyst pieces preferably have a width of 0.1 mm to about 2 cm, with a preferred thickness of less than 1 cm, more preferably, about 1 to about 3 mm. The inventive catalyst may provide numerous advantages to catalytic processes such as: chemical stability, stability to repeated thermal cycling, thermal stability, efficient loading and unloading of catalysts, high rates of heat transfer and mass transfer, and maintenance of desired catalytic activity.

In constructing preferred embodiments of the heat exchanger, thin sheets or tubes can be used to obtain high heat duties and short contact times. The thickness of the web between the reaction channel and the heat exchange channel can vary, but is preferably between about 0.01 inches and about 0.25 inches. The preferred thickness for the heat exchange channel (meaning the thickness of the smallest dimension of the heat transfer channel) preferably ranges from 100 microns to 10 millimeters. In some preferred embodiments, this smallest dimension may be channel width, in other embodiments, channel height. The preferred thickness is 250 microns to 3 millimeter. Flow of the heat transfer fluid may be either counter-current, cross-current, or co-current to the direction of the flow of reactants. Preferred heat transfer fluids include: a combustion stream (for endothermic reactions), oil (lower temperature reactions), and steam.

The metal surfaces within microchannel apparatus can be coated with either or both the buffer and the interfacial layers. This can be done using any of the processes described herein, preferably by vapor deposition. Preferred coating materials include titania and and 5–10% $SiO_2/Al_2O_3$. The interior surfaces of the reaction chamber, heat exchanger and other surfaces of microchannel apparatus may be coated. In some embodiments, the walls of a reaction chamber can be coated with an optional buffer layer, an interfacial layer, and a catalytically active material—typically the catalytically active material and the interfacial layer combine to form a supported catalyst. Coatings can also be applied to metal walls in tubes and pipes that form connections to or within microchannel apparatus.

The inventive method is preferably carried out in a reaction chamber in which the catalyst has a thickness of about 2 cm or less and is touching or in close proximity (within about 1 mm) of a reaction chamber wall, where the reaction chamber wall is in thermal contact with a heat exchanger. Heat transfer from (or to) the reaction chamber is preferably enhanced by addition of microchannels on at least one chamber wall through which heat is transferred, preferably, on the side of the reaction chamber wall opposite the catalyst structure. The catalyst preferably has contiguous and relatively large pores, such as in a foam, to avoid large pressure drops. Preferably the pore size of the large pores in the catalyst is between about 10 $\mu$m and about 300 $\mu$m.

Catalytic processes of the present invention include: acetylation, addition reactions, alkylation, dealkylation, hydrodealkylation, reductive alkylation, amination, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, hydrodesulferization/hydrodenitrogenation (HDS/HDN), isomerization, methanation, methanol synthesis, methylation, demethylation, metathesis, nitration, oxidation, partial oxidation, polymerization, reduction, steam and carbon dioxide reforming, sulfonation, telomerization, transesterification, trimerization, water gas shift (WGS), and reverse water gas shift (RWGS).

The reaction process or processes of the present invention can be conducted in parallel, with tens, hundreds, thousands, or millions of small reaction chambers, each chamber having an internal diameter less than about 2 inches, preferably less than about 2 cm, more preferably ranging from about 1 mm to about 5 mm. The reaction process or processes can also be run in series. For example, products from one reaction chamber can be fed to another reaction chamber having the same or a different catalyst. A series of reactions could also be conducted by placing a series of different catalysts within the same reaction chamber. Reaction products can be collected and stored, for example in tanks, or immediately consumed in subsequent reactions.

Reactors and methods of the present invention can be characterized by various properties that they exhibit. Heat flux is a particularly important characteristic in the present invention. For the sum of the volume of the reaction chamber(s) and heat exchanger chamber(s) including the volume of chamber walls, the present invention preferably exhibits a heat flux during steady-state operation of at least about 0.6 W/cc, more preferably above about 1 W/cc still more preferably between about 5 and about 250 W/cc, and in another preferred range, between about 10 and 100 W/cc. These heat fluxes can be obtained at short contact times and low pressure drops through the reaction chamber. The contact time is preferably less than about 0.3 seconds, more preferably, less than about 0.1 seconds, still more preferably, less than about 0.05 seconds and yet more preferably, less than about 0.01 seconds. The pressure drop through the reaction chamber is preferably less than about 15 psig (pounds per square inch gauge), more preferably less than about 10 psig, still mores preferably less than about 5 psig, and yet more preferably less than about 1 psig. In the apparatus and methods of the present invention, these high fluxes can be obtained in a wide variety of catalyzed reactions and is not limited to the highly exothermic, deep oxidation (combustion) reactions.

It has been surprisingly discovered that the aforementioned short contact times and high heat fluxes can be obtained in steady-state, catalyzed thermal reactions. Factors that can contribute to shorter contact times and higher heat flux include: catalysts with fast intrinsic kinetics, porous catalysts, thermally conductive supports, the use of microchannel apparatus, short distances for thermal transport in the reaction chamber and/or heat exchanger; short mass transfer distances in the reaction chamber; and selection of heat transfer fluid(s). The transfer of a sufficiently high heat flux is an important aspect of the present invention. The selection of various process factors can depend on the particulars of a given thermal chemical reaction; precise control of all factors is not required in every case. Guided by the descriptions herein, persons skilled in this technological area can, without undue experimentation, control these factors to obtain the desired level of flux.

The reactors and methods of the present invention can also be characterized by their high rates of production per unit reactor volume. For example, in a steady-state process for steam reforming of a gaseous or liquid hydrocarbon, the inventive process preferably produces more than 0.01 standard liter per minute (SLPM) of hydrogen gas per cubic centimeter (cc) of reactor hardware (the sum of the volume of the reaction chamber(s) and heat exchanger chamber(s) including the volume of chamber walls), more preferably more than 0.1 SLPM of hydrogen gas per cc of reactor hardware. Typically, the production rate of hydrogen case can range up to about 0.5 SLPM or more of hydrogen gas per cubic centimeter of reactor hardware. In the more general case, the reactors and methods of the present invention can consume more than about 0.01 SLPM of reactant gas per cubic centimeter of reactor hardware. By building multiple reaction chambers and heat exchangers operating in parallel, reactors and methods of the present invention can produce thousands or millions or more of liters of product per day.

The invention also provides a method of suppressing undesirable chemical reactions, especially coke formation. The reactors and methods of the present invention can be characterized by their ability to suppress chemical products that are slower forming, kinetically, or which are more likely to form within a reactor that has a lesser degree of temperature control. For example, in the steady-state process for a water-gas shift reactor, methanation is a common side reaction that does not take place as quickly as the reaction of interest, for the conversion of carbon monoxide to carbon dioxide. Likewise, coke is a slower forming by-product in steam reforming reactions, with the prevalence for the reaction is also a function of the temperature of the catalyst surface. In these cases, the reactors and methods of the present invention can support the primary reactions of interest (e.g., water-gas shift and steam reforming) while enhancing the ability of the system to avoid or suppress the formation of certain undesirable secondary products (e.g., methane and coke). More generally, the reactors and methods of the present invention can be used for suppressing other undesirable byproducts where their formation can be avoided through short contact times and/or enhanced temperature control.

EXAMPLE 1

An experiment was conducted to demonstrate a chemical thermal reactor according to the present invention using the water gas shift reaction.

A first porous insert was made with a catalyst material of a pre-reduced and stabilized 5-wt % Ru/ZrO$_2$ catalyst (⅛-inch extrudates) obtained from Degussa Corporation. The catalyst material was ground and sieved to 65 to 100 mesh.

A second porous insert was made with Ni metal foam with 80 pores per inch (ppi) machined to fit in a 7 mm ID quartz tube, ranging from 0.5 to 2.5 cm in length. The metal foam was washed in a sonicator with acetone, chloroform, and water successively over 10-minute intervals. It was also etched in a 1M HCl solution at 60° C. for 30 min. The etched metal foam was saturated with a zirconium n-propoxide/1-propanol solution (Aldrich), followed by ambient hydrolysis with water vapor for 72 h, then calcined at 450° C. for 4 h to form the interfacial layer. The $ZrO_2$-coated metal foam was saturated with a dilute aqueous $RuCl_3$ solution ($RuCl_3$ hydrate, Aldrich). The saturation process was repeated several times until the desired Ru loading was achieved. The coated metal foam supported Ru catalyst was finally dried at 100° C. in vacuum overnight, followed by calcination at 350° C. for 1 h. Prior to testing, the catalyst was activated with a 10%$H_2$/He mixture at 350° C. for at least 1 h.

A catalytic plug flow reactor (PFR) system was used to test both porous inserts. The PFR was configured in a single-zone furnace as the heat transfer chamber. The reactor system included a steam generator placed directly prior to the reactor inlet, a PFR housed within the furnace, and a condenser located at the reactor outlet. The porous insert was packed in a 7 mm ID quartz tube, which was necked at the center. The feed water was fed to the steam generator using a Cole Parmer syringe pump. Carbon monoxide and nitrogen (a diluent) were fed to the system using Matheson mass flow controllers. The mixed feed stream flowed through the steam generator before entering the PFR in a downflow fashion. The product gases were directed through the condenser and sent to an on-line gas chromatograph, where the product stream was analyzed.

Two thermocouples were placed inside the catalytic PFR system. One thermocouple was located above the porous insert. The second thermocouple was placed adjacent to the porous insert outside of the quartz tube to measure the furnace temperature. A pressure gauge at the reactor inlet was used to measure the differential pressure across the porous insert.

The product gases were analyzed immediately upon exit from the reactor with a Microsensor Technology Inc., (MTI) M200 Gas Chromatograph. Using a 10-m molecular sieve column (argon carrier gas, 100° C., 34.1 psig) and an 8-m PoraplotU column (helium carrier gas, 65° C., 26.9 psig) in parallel, the GC analyzes for hydrogen, nitrogen, oxygen, methane, carbon monoxide, air, carbon dioxide, ethane, and ethylene in 75 sec. The M200 used a vacuum pump to draw a small sample from the product stream with a 40-sec purge and a 100-millisecond injection time. Water was removed from the gas stream prior to entering the M200.

Carbon monoxide conversion was calculated based on the moles of material in the inlet and outlet gas stream, as shown in equation 1. The selectivity to carbon dioxide (and hydrogen) or methane was calculated in equations 2 and 3, respectively.

$$X_{CO} = 100 * (n_{CO-in} - n_{CO-out})/n_{CO-in} \quad (1)$$

$$S_{CO2} = 100 * n_{CO2}/(n_{CO2} + n_{CH4}) \quad (2)$$

$$S_{CH4} = 100 - S_{CO2} \quad (3)$$

Figure 2A:
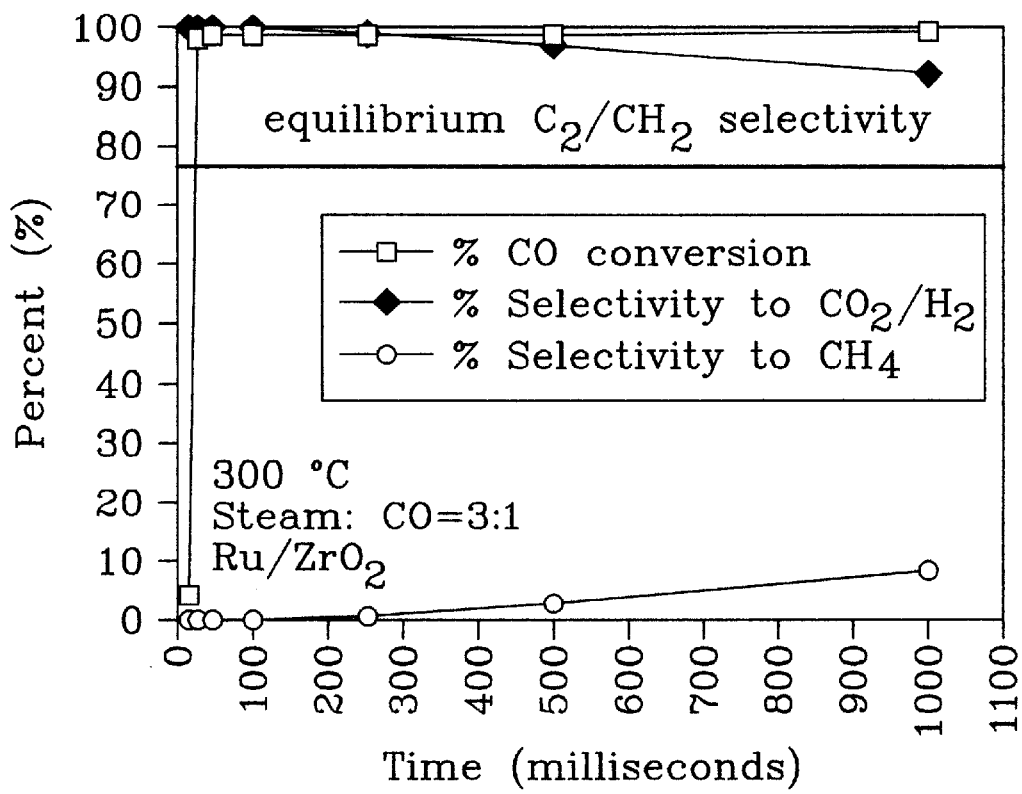
FIG. 2a is a graph of percent selectivity versus residence time for long contact time water gas shift with a powder catalytic porous insert.
Figure 2B:
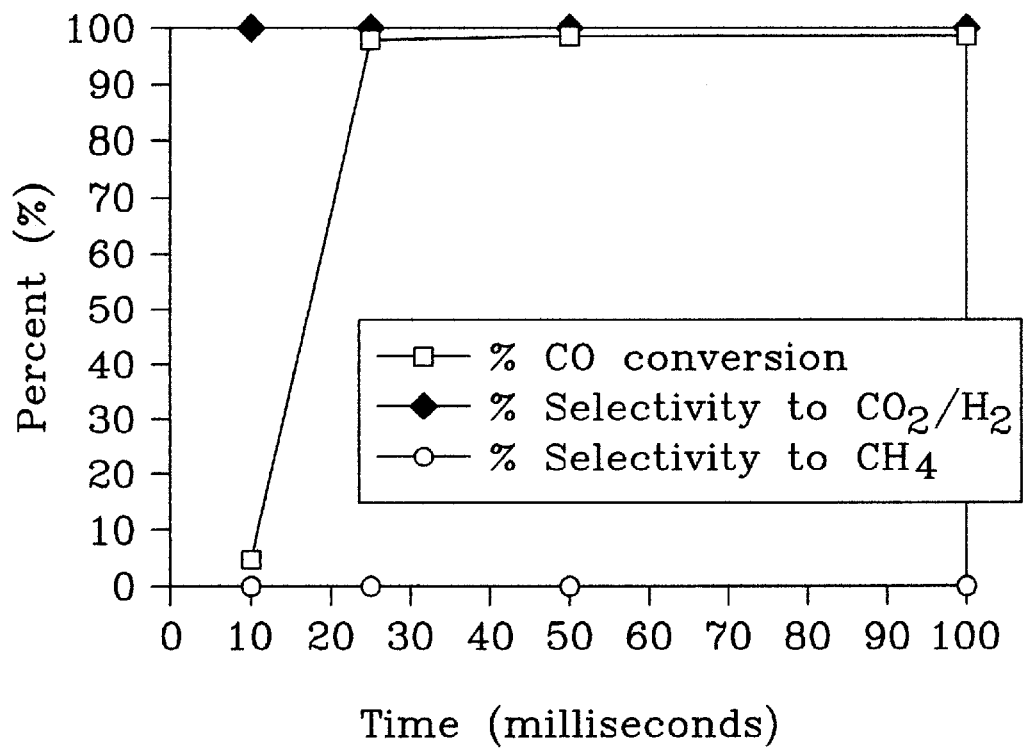
FIG. 2b is a graph of percent selectivity versus residence time for short contact time water gas shift with a powder catalytic porous insert.

Using the first porous insert, fine catalyst powders (65 to 100 mesh), the intrinsic reaction kinetics were approximately measured. The contact time varied from 10 milliseconds to 1 sec. FIGS. 2a and 2b show the performance for long and short contact times. At 300° C. and a steam to carbon ratio of 3:1, 25 milliseconds on the Ru-based catalyst was sufficient to convert greater than 98% of the carbon monoxide to carbon dioxide and hydrogen. At 50 milliseconds, a CO conversion of 99:8% was measured with a selectivity of 100% to the desired products ($CO_2$ and $H_2$). The equilibrium conversion of CO at 300° C. and a steam to carbon ratio of 3:1 was 99.93%.

Tests with longer contact times (>100 milliseconds) showed the formation of methane, which has an equilibrium selectivity of 22.82%. The equilibrium selectivity line for carbon dioxide and hydrogen is shown on FIG. 2a. As the contact time increased, the formation of methane also increased. A software package, FACT™, was used for all equilibrium calculations.

Figure 3:
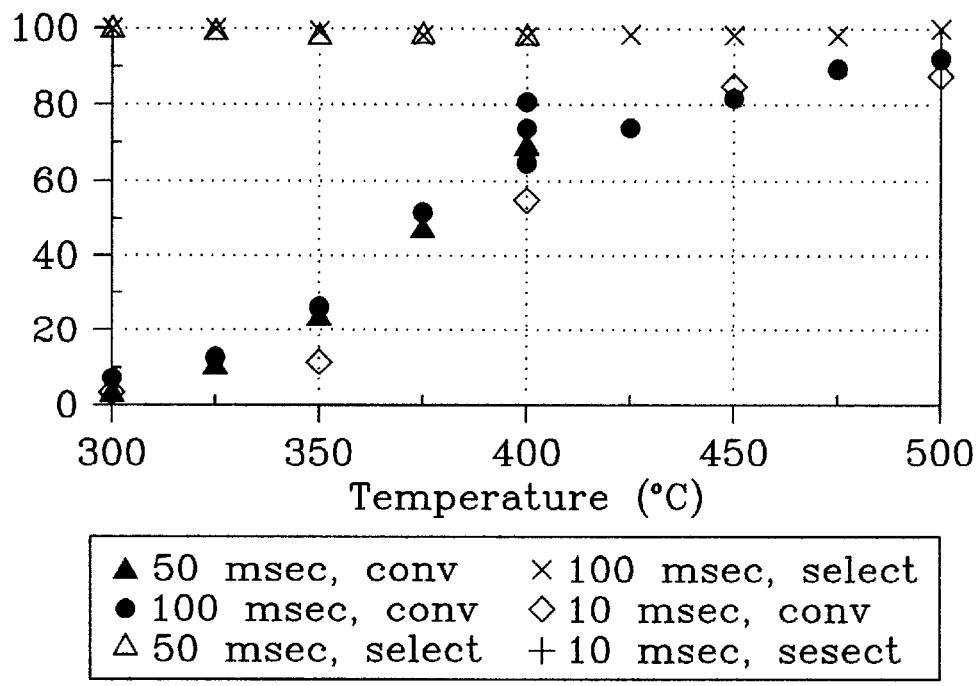
FIG. 3 is a graph of percent selectivity versus temperature for various contact times for water gas shift with, a coated metal foam porous insert.

The results with the second porous insert (coated metal foam) are shown in FIG. 3. At 300° C., the CO conversion was less than 10%. However, at 500° C. and a steam to carbon ratio of 3:1, the measured carbon monoxide conversion reached 94% with a contact time of 50 milliseconds. The equilibrium conversion was 94.53% at these conditions. With a contact time as short as 10 milliseconds, the carbon monoxide conversion exceeded 90% and 100% selectivity to carbon dioxide and hydrogen was observed. The equilibrium $CO_2$ selectivity was 93.52% at 500° C.

At the contact times of 10, 50, and 100 milliseconds, the measured selectivity remained near 100%, with methane below the detectability limit of the GC. These findings showed that desired non-equilibrium chemistry was exploited in the coated metal foam. Unwanted series and slow parallel reaction pathways, such as the formation of methane, were effectively shut down.

The second porous insert of the coated metal foam had a higher activation temperature than the first porous insert of catalyst powder for two reasons. First, the catalyst washcoat had a slightly different composition and structure than the catalyst powders. Independent catalyst tests with powders made from the same washcoat verified the higher required activation temperature. The other distinction between the two porous inserts was a reduced weight of active catalyst (approximately 10%) on the coated metal foam.

EXAMPLE 2

Figure 4:
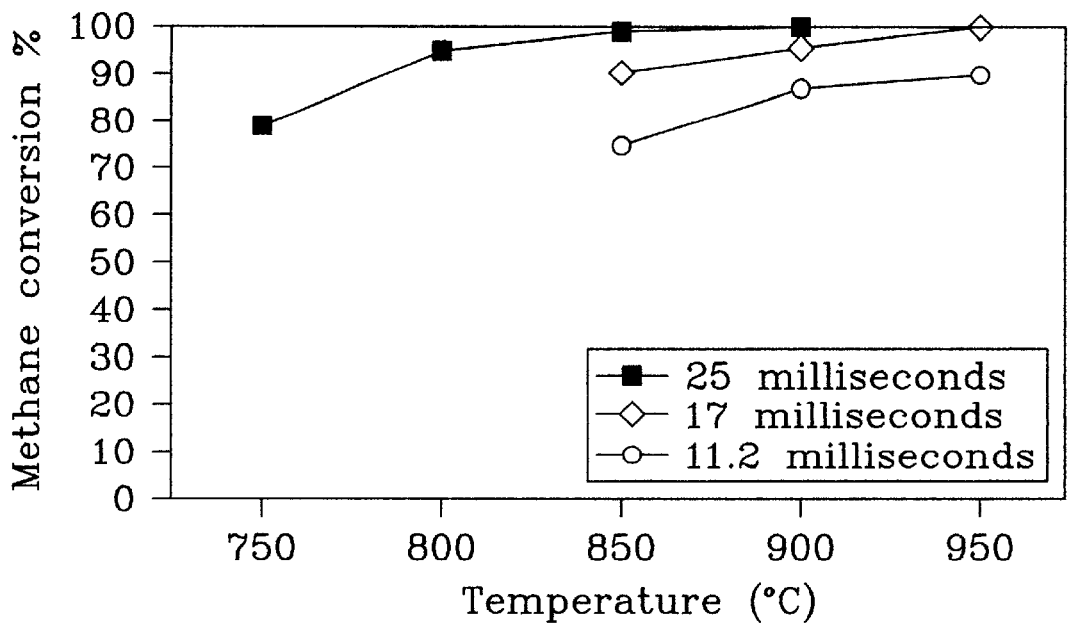
FIG. 4 is a graph of methane conversion versus temperature for various contact times for a steam to methane ratio of 2.5:1.

An experiment was conducted to demonstrate hydrocarbon steam reforming according to the present invention;

Using the first porous insert (powder) as in Example 1, methane steam reforming was achieved with 100% conversion at 850° C. in 25 milliseconds on a 5%Rh/gamma-$Al_2O_3$ catalyst (FIG. 4). Using the second porous insert (coated metal foam) as in Example 1, with a 5%Rh/$Al_2O_3$ catalyst/interfacial layers on 80 ppi stainless steel metal foam reduced the operating temperature by 100° C. to achieve the same performance at 750° C.

No coke formation was observed during any of the millisecond residence time experiments with lower steam to methane ratios (2.5:1).

Results for other hydrocarbons are shown in Table E2-1 wherein "time" is residence time. The data on butane, gasoline and kerosene were obtained using a powder catalyst while the data on isooctane were obtained using a foam catalyst.

TABLE E2-1

Preliminary hydrocarbon reforming data based on 5% Rh/Al$_2$O$_3$ catalyst screening tests

| Hydrocarbon | Temperature (C.) | Time (ms) | Conversion % | H2 Sel. % |
|---|---|---|---|---|
| Butane | 600 | 25 | 100 | 96 |
| Gasoline | 800 | 50 | 95 | ~95 |
| Iso-octane[A] | 700 | 25 | 100 | 89.5 |
| Kerosene | 600 | 50 | 95 | ~98 |

[A]Catalyst material included a titania buffer layer

Figure 5A:
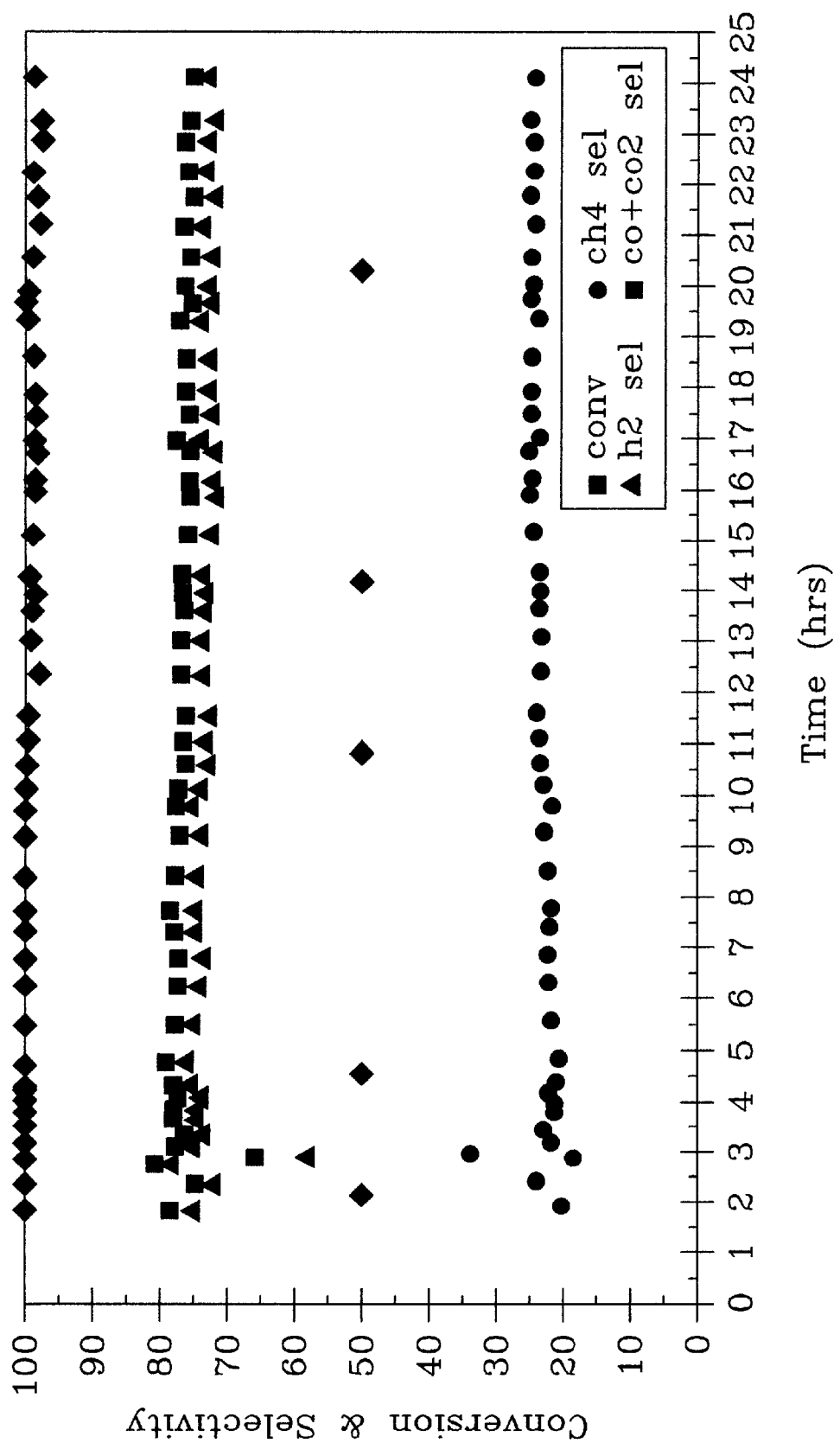
FIG. 5a is a graph of conversion and selectivity versus time for n-butane steam reforming with a porous catalyst insert.
Figure 5B:
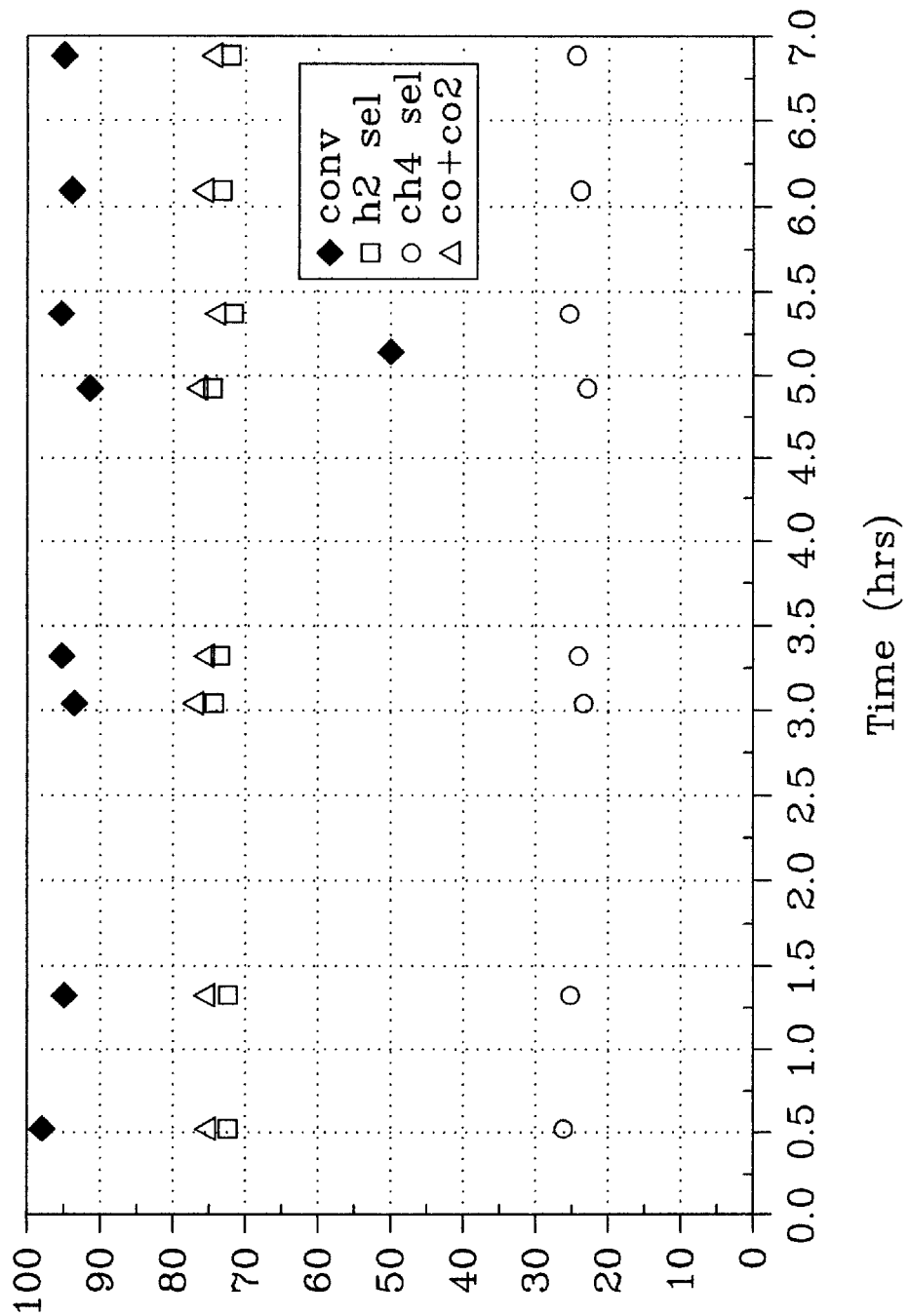
FIG. 5b is a graph of conversion and selectivity versus time for n-butane steam reforming with a regenerated porous catalyst insert.

Further data for an n-butane steam reforming experiment are shown in FIG. 5a. A porous insert consisted of 80 ppi stainless steel with an interfacial layer of alumina and a catalyst material of rhodium (15.6 wt % Rh on 17.1 wt % alumina, balance stainless steel foam, no buffer layer). Conditions were 650° C. at 95 ms residence time with a steam to carbon ratio of 3.58:1. The pressure drop increased from negligible to over 7 psig, attributed to cracking and spalling of the interfacial and catalyst layers. The catalyst was regenerated in air to remove deposited carbon. FIG. 5b shows poorer performance. Pressure drop increased to over 7 psig after only 5 operating hours in two days.

EXAMPLE 3

Figure 6:
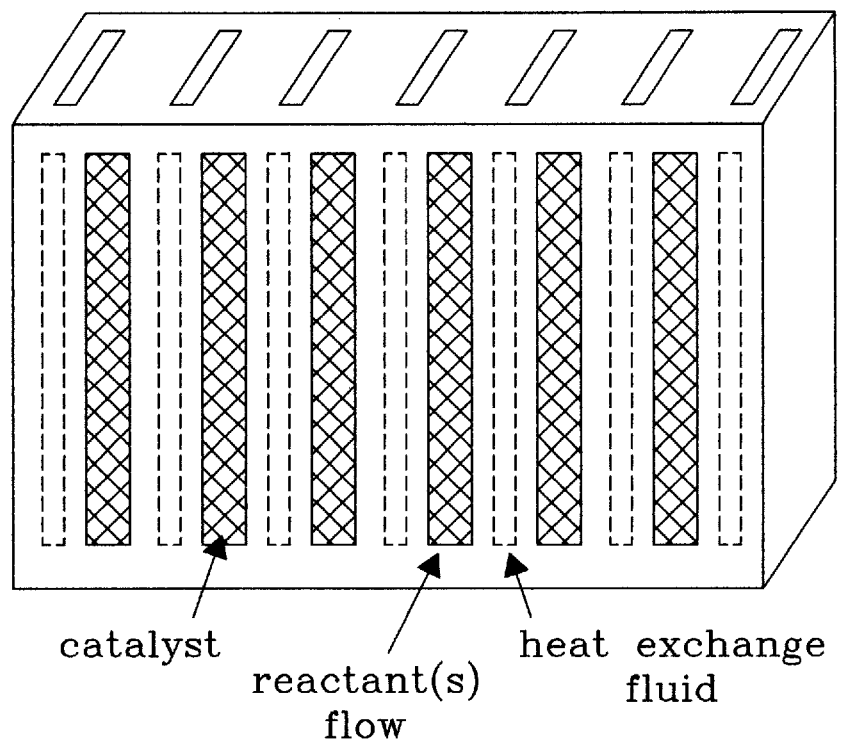
FIG. 6 illustrates design features of a microchannel reactor having multiple reaction chambers and heat exchangers.

A preferred, contemplated, embodiment of the invention is shown in FIG. 6. The distance from the heat source to heat sink is about 1 centimeter or less. This distance is a function of the heat duty, the selection of heat transfer fluid(s), and the effective thermal conductivity of the porous catalyst insert. The porous catalyst insert may have a porosity greater than 95%, which creates an effective thermal conductivity roughly two orders of magnitude below the pure metal or alloy forming the porous support.

Thin sheets or tubes can be used to obtain high heat duties and short contact times. The thickness of the web between the reaction channel and the heat exchange channel can vary, but is preferably between about 0.01 inches and about 0.25 inches. The preferred thickness for the heat exchange channel preferably ranges from 100 microns to 10 millimeters. The preferred thickness is 250 microns to 3 millimeter. Flow of the heat transfer fluid may be either counter-current, cross-current, or co-current to the direction of the flow of reactants.

Figure 7:
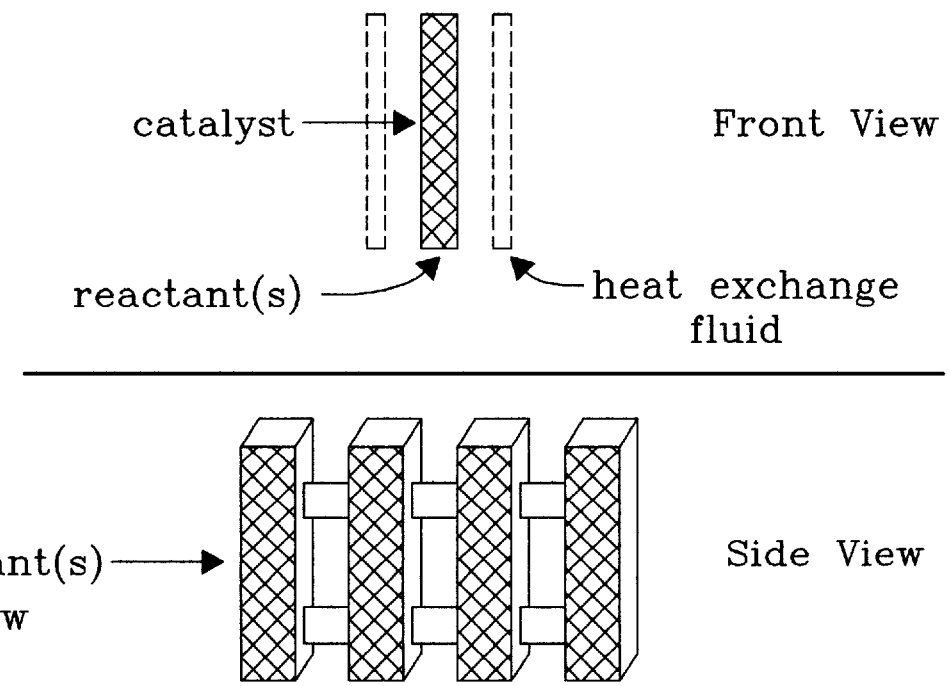
FIG. 7 illustrates front (top) and side (bottom) views of a reactor design having porous catalyst inserts within a reaction chamber.
Figure 8:
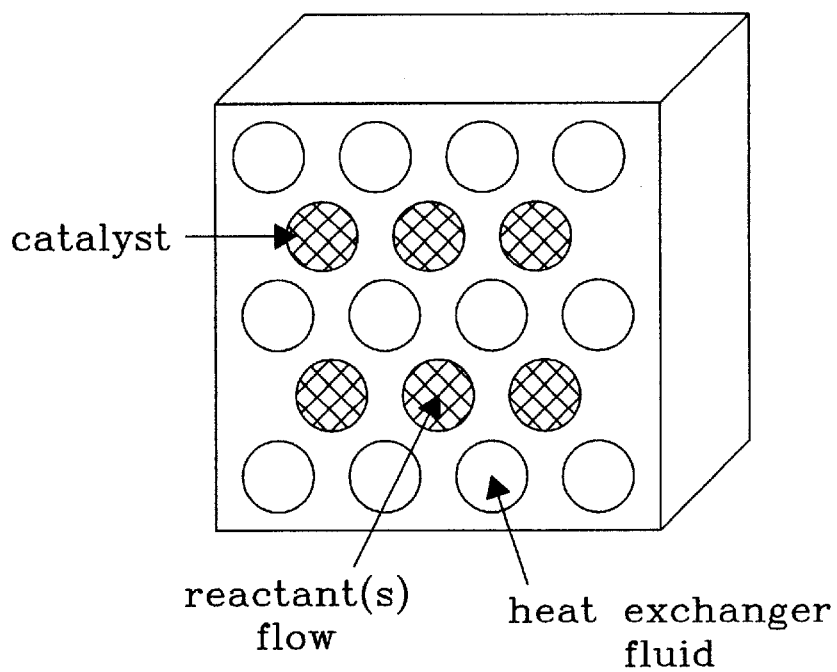
FIG. 8 illustrates a cross-sectional view of a reactor design having cylindrical reaction chambers and heat exchangers.

The thickness for the catalyst preferably ranges from 100 microns to 10 millimeters. The preferred thickness is 250 microns to 1 millimeter. The catalyst may be comprised of a single contiguous porous monolithic catalyst, or may be created by placing multiple porous monoliths adjacent to each other. The porous monoliths may also be inserted with a gap between the porous monolith catalysts, or with a smaller monolith (as shown in FIG. 7) adjacent to and/or between larger monoliths. Preferably, one or several equal sized monoliths are adjacent to each other; this design option will favor contact of the reactants with the catalyst surface.

The volumetric heat flux using short contact time reactions within a device that can facilitate a high heat duty should easily exceed 0.6 W/cc. It has been shown that heat duties in the range of 1 to 10 W/cc are well within the range of this catalyst and reactor. Higher heat duties, up to 100 W/cc, can also be achieved if the contact time is less than 25 milliseconds and if the distance between the heat source and sink is on the order of one millimeter (about 0.5 to about 5 mm).

EXAMPLE 4

A compact reactor that transferred roughly 10 W/cc to 16 W/cc was demonstrated for the steam reforming of isooctane. The steam reforming reaction uses steam to transform hydrocarbons into CO and H$_2$. For the case of isooctane steam reforming, the reaction stoichiometry is:

$$\text{iso-}C_8H_{18} + 8H_2O \rightarrow 8CO + 17H_2,$$

and the standard heat of reaction is strongly endothermic ($\Delta H_r^\circ = +1275$ kJ/mole of isooctane). Isooctane was chosen to simulate gasoline because it represents the mid-range molecular weight of gasoline's hydrocarbon mixture. The steam reforming reaction is often run at steam concentrations higher than the reaction stoichiometry shown above to avoid coke formation and to improve conversion. The steam concentration is usually given in the form of the steam to carbon ratio (S:C), the ratio of steam molecules per carbon atom in the reactant feed. A ratio greater than one points to a greater than stoichiometric steam concentration, and under those conditions the water gas shift reaction also takes place as a secondary reaction.

A microchannel isooctane steam reformer was built, with a total volume of roughly 30 cubic centimeters. This reactor has integrated heat exchange to add the heat needed for this highly endothermic reaction. The heat exchange fluid used to heat the reactor zone was combustion gas set at 750° C. and a total flowrate of roughly 100 SLPM. This design was built to process a hydrogen gas stream large enough to produce 1.0 kilowatt equivalent electric (kW$_e$) power in a PEM fuel cell. The reactor configuration is shown in FIG. 6. There were 12 reactant channels interspersed between 13 heat exchange channels. The reaction channels had a thickness of roughly 0.03 inches, a length of 1.1 inch, and a channel height of 1 inch. The heat exchange channels had an identical length and height. The thickness of the heat exchange channels was roughly 0.02 inches. The web thickness between the reaction and heat exchange channel was roughly 0.19 inches.

The catalyst was a 1 5wt % Rh$_2$O$_3$ on an aluminum containing spinel coated on a porous stainless steel foam. The specific details of catalyst preparation are as follows. Gamma alumina support (Strem) was calcined at 500° C. for 5 hours. The incipient wetness method was used to impregnate magnesium nitrate solution on the alumina support to achieve 5 wt % MgO. The modified support was dried at 110° C. in vacuum for 4 hours followed by calcination at 900° C. for 2 hours to form the aluminum containing spinel support. The spinel support was impregnated with a rhodium nitrate solution (Engelhard) using the incipient wetness technique to reach the desired Rh$_2$O$_3$ loading. After drying at 110° C. in vacuum for 4 hours, supported Rh powder catalyst was calcined at 500° C. for 3 hours. The powdered catalyst was ball milled overnight and slurry dip-coated on a 80 ppi (Astromet, Cincinnati, Ohio) stainless steel foam. Prior to the dip-coating, the stainless steel foam was coated with the titania and alumina buffer layer using CVD.

Figure 9:
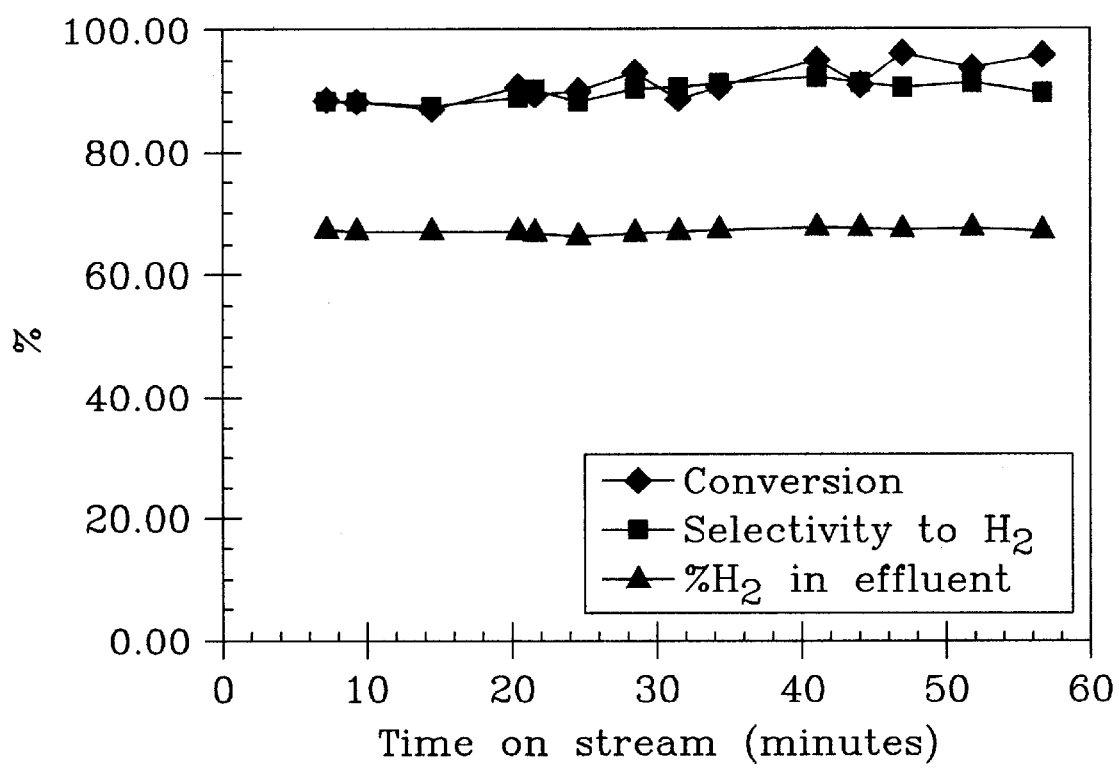
FIG. 9 is a graph showing conversion %, $H_2$ selectivity and % $H_2$ in effluent of an isooctane steam reforming process.

The data from the microchannel isooctane steam reformer's first hour of operation is shown in FIG. 9. The inlet flowrate of liquid isooctane was 2.54 mL/min. The reactor zone was operated at 650° C. and one atmosphere. The reactants had a 6:1 steam to carbon ratio, which created a total contact time of roughly 22 milliseconds within the sum of the total reaction channels. The reactor was able to reach isooctane conversions ranging from 86.5% to 95%, thus requiring roughly 300 W of thermal energy. The hydrogen selectivity was in the 85 to 90% range. The results show that the microchannel isooctane steam reformer reactor can supply the heat necessary to sustain this reaction with a high processing rate per unit reactor volume. The reactant side pressure drop through this device was roughly 6.9 kPa (1.0 p.s.i). The expected fuel cell output under these conditions was sufficient to produce 0.5-$kW_e$ electrical output from a PEM fuel cell. This demonstration was continued for another hour and then shut down. The volumetric heat flux of the reactor was roughly 10 W/cc.

Figure 10:
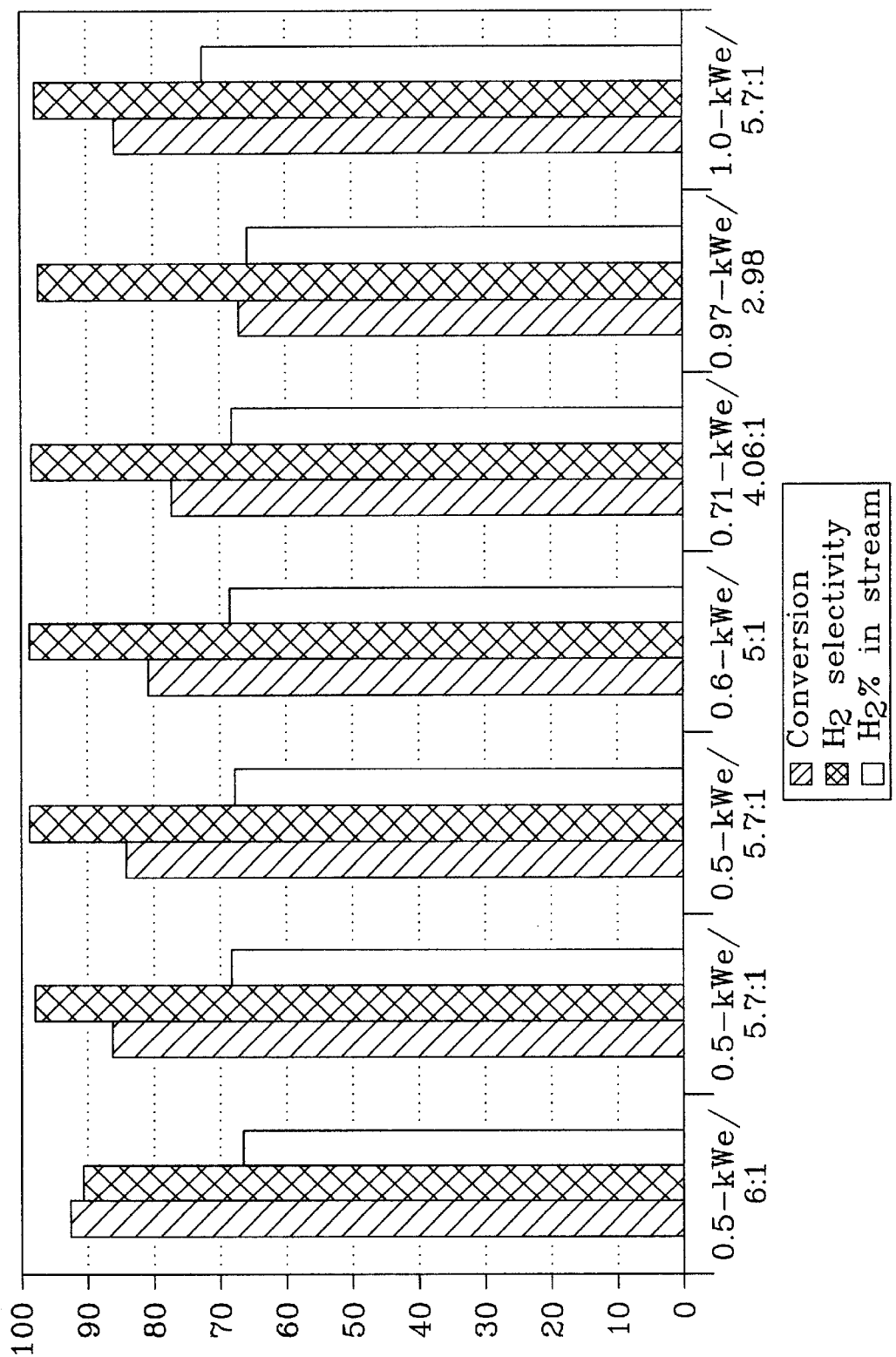
FIG. 10 is a bar graph showing conversion %, $H_2$ selectivity and % $H_2$ in effluent of an isooctane steam reforming process at varying steam to carbon ratios.

Another three demonstrations were run using this device, putting the device through four thermal cycles. These four thermal cycles put the device through over 12 total hours of on-line service. The results of the final three thermal cycles in bar chart form in FIG. 10. All of the results in FIG. 10 are at one atmosphere, a 630 to 670° C. temperature range and a 22 millisecond contact time within the sum of the total reaction channels. The results for the equivalent 0.5-$kW_e$ power output and the 6:1 steam to carbon ratio for these tests are consistent with the values shown in FIG. 9. As the steam to carbon ratio is lowered from 6:1 to 5.7:1, 5:1, 4.06:1, and finally to 2.98:1, the isooctane conversion decreases, but the hydrogen selectivity remains steady. At constant residence time, the effect of reducing the steam to carbon ratio is the same as increasing the isooctane flow rate. So while the conversion percentage decreases with decreasing steam to carbon ratio, the amount of isooctane being converted increases, resulting in a net increase in the actual rate at which hydrogen is generated. This is seen in the higher equivalent electrical power output listed with these values. The last set of bar data on the far right side of FIG. 10 are the results acquired with a 5.7:1 steam to carbon ratio and roughly half the originating contact time, resulting in a 1.0-$kW_e$ equivalent power output. Under these conditions, nearly 500 W of thermal energy were required to convert roughly 75% of the inlet isooctane stream set at 5.04 mL/min. This device demonstrated a volumetric heat flux greater than 16 W/cc.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A process for the catalytic conversion of at least one reactant in a thermal chemical reaction, excluding deep oxidation, comprising:

passing at least one reactant into at least one reaction chamber;

said reaction chamber comprising a catalyst that catalyzes the reaction of said at least one reactant;

transferring heat to or from said at least one reaction chamber into at least one heat exchanger; and obtaining at least one product from said reaction chamber;

wherein said step of transferring heat, at steady state, transfers at least 0.6 W/cc of total reactor volume, where total reactor volume is defined as the sum of the volume of the reaction chamber(s) and heat exchanger chamber(s) including the volume of chamber walls;

wherein a contact time of the reactant with the catalyst is less than about 0.3 seconds; and wherein a pressure drop through the reaction chamber is less than about 15 psig.

2. The process of claim 1 wherein said catalytic conversion is selected from the group consisting of: acetylation, addition reactions, alkylation, dealkylation, hydrodealkylation, reductive alkylation, amination, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation homologation, hydration, dehydration, hydrogenation, dehydrogenation, hydrocarboxylation, hydroformylation, hydrogenolysis, hydrometallation, hydrosilation, hydrolysis, hydrotreating, hydrodesulferization/hydrodenitrogenation (HDS/HDN), isomerization, methanation, methanol synthesis, methylation, demethylation, metathesis, nitration, oxidation, partial oxidation, polymerization, reduction, steam and carbon dioxide reforming, sulfonation, telomerization, transesterification, trimerization, water gas shift (WGS), and reverse water gas shift (RWGS).

3. The process of claim 1 wherein the at least one product obtained from said reaction chamber is fed to another reaction chamber containing a different catalyst.

4. The process of claim 1 wherein said step of transferring heat, at steady state, transfers at least about 1.0 W/cc of total reactor volume.

5. The process of claim 4 wherein a wall of the reaction chamber through which heat is exchanged comprises microchannels.

6. The process of claim 4 wherein the pressure drop is less than 10 psig.

7. The process of claim 1 wherein said step of transferring heat, at steady state, transfers between 5 and 250 W/cc.

8. The process of claim 1 wherein said step of transferring heat, at steady rate, transfers between 10 and 100 W/cc.

9. The process of claim 1 wherein the pressure drop is less than 5 psig.

10. The process of claim 1 wherein the catalyst comprises a monolith having a thickness of about 1 to about 3 mm.

11. The process of claim 1 wherein the reaction chamber has a length less than or equal to 6 inches and a height less than or equal to 2 inches.

12. The process of claim 11 which is conducted in parallel in multiple reaction chambers, wherein each of the reaction chambers has a height less than 2 cm.

13. The method of claim 12 wherein the at least reaction chamber and the at least one heat exchanger are separated by a web having a thickness of between 0.01 and 0.25 inches.

14. The process of claim 1 wherein the process produces less than about 0.5 SLPM of hydrogen gas per cubic centimeter of reactor volume.

15. The process of claim 14 wherein the reaction chamber has a length less than or equal to 6 inches and a height less than or equal to 2 inches.

16. The process of claim 15 wherein the heat exchanger comprises a fluid selected from the group consisting of: a combustion stream, steam and oil.

17. The process of claim 16 wherein the at least one heat exchanger has a thickness of 250 $\mu$m to 3 mm.

18. The process of claim 15 wherein the pressure drop through the reaction chamber is less than 10 psig.

19. A process for the catalytic conversion of at least one reactant in a thermal chemical reaction, excluding deep oxidation, comprising:

passing at least one reactant into at least one reaction chamber;

said reaction chamber comprising a catalyst that catalyzes the reaction of said at least one reactant;

transferring heat to or from said at least one reaction chamber from or into said at least one heat exchanger; and obtaining at least one product from said reaction chamber;

wherein said step of transferring heat, at steady-state, transfers at least 0.6 W of heat per cc of total reactor volume, such that, at steady state, the, catalyst is maintained within a temperature range that reduces the formation of at least one undesirable chemical reaction product.

20. A process for the catalytic conversion of at least one reactant in a thermal chemical reaction, excluding deep oxidation, comprising:

passing at least one reactant into at least one reaction chamber;

said reaction chamber comprising a porous catalyst that catalyzes the reaction of said at least one reactant;

transferring heat to or from said at least one reaction chamber from or into at least one heat exchanger; and obtaining at least one product from said reaction chamber;

wherein said porous catalyst comprises a metal support; and wherein a contact time of the reactant is less than about 0.3 seconds, and the step of transferring heat, at steady state, transfers at least about 0.6 W/cc of total reactor volume, thereby suppressing slow reactions and the formation of at least one undesirable chemical reaction product.

21. The catalytic process of claim 20 wherein the desirable reaction is the water-gas shift reaction, with desirable products being carbon dioxide and water, and an undesirable product is methane.

22. The catalytic process of claim 20 wherein the desirable reaction is steam reforming of a hydrocarbon, with the desirable products being hydrogen and carbon monoxide and/or carbon dioxide, and where an undesirable product is coke.

23. The process of claim 20, wherein the contact time is less than 0.05 seconds.

24. The process of claim 19 wherein the reaction chamber has a length less than or equal to 6 inches and a height less than or equal to 2 inches.

25. The process of claim 24 which is conducted in parallel in multiple reaction chambers, wherein each of the reaction chambers has a height less than 2 cm.

26. The process of claim 20 which is conducted in parallel in multiple reaction chambers, wherein each of the reaction chambers has a height less than 2 cm.

27. The process of claim 20 wherein the reaction chamber has a length less than or equal to 6 inches and a height less than or equal to 2 inches.

28. The process of claim 20 wherein the at least one heat exchanger has a dimension of 250 $\mu$m to 3 mm.

29. A method for suppressing formation of at least one undesirable chemical reaction product in a thermal chemical reaction, comprising:

passing at least one reactant into at least one reaction chamber;

said reaction chamber comprising a porous catalyst that catalyzes the reaction of said at least one reactant;

transferring heat to or from said at least one reaction chamber from or into at least one heat exchanger; and obtaining at least one product from said reaction chamber;

wherein said porous catalyst comprises a metal support; and comprising at least one of the following process steps:

at steady-state, transferring at least 0.6 W of heat per cc of total reactor volume, such that, at steady state, the catalyst is maintained within a temperature range that reduces the formation of at least one undesirable chemical reaction product; or maintaining a contact time of the reactant at less than about 0.3 seconds, thereby suppressing slow reactions and reducing the formation of at least one undesirable chemical reaction products.

30. The method of claim 29, wherein said thermal chemical reaction is steam reforming and said of at least one undesirable chemical reaction product comprises coke.

31. The process of claim 29 wherein the catalyst comprises an interfacial layer on a porous support, and a thermal coefficient of expansion of the porous support is different from a thermal coefficient of the interfacial layer.

32. The process of claim 31 wherein a catalyst material is deposited on the interfacial layer.

33. The process of claim 32 wherein said step of transferring heat, at steady state, transfers between 5 and 250 W/cc.

34. The process of claim 31 wherein said step of transferring heat, at steady state, transfers at least about 1.0 W/cc of total reactor volume.

35. The process of claim 34, wherein said step of transferring heat, at steady rate, transfers between 10 and 100 W/cc.

36. The process of claim 34, wherein the contact time is less than 0.1 seconds.

37. The process of claim 29, wherein the contact time is less than 0.05 seconds.

38. The process of claim 29 wherein said thermal chemical reaction is the water-gas shift reaction, wherein an undesirable product is methane.

39. The method of claim 29 wherein the reaction chamber has a height in the range of 1 mm to 5 mm.

40. A process for the catalytic conversion of at least one reactant in a thermal chemical reaction, excluding deep oxidation, comprising:

passing at least one reactant into at least one reaction chamber;

said reaction chamber comprising a catalyst that catalyzes the reaction of said at least one reactant;

transferring heat to or from said at least one reaction chamber into at least one heat exchanger; and obtaining at least one product from said reaction chamber;

wherein said step of transferring heat, at steady state, transfers at least 0.6 W/cc of total reactor volume, where total reactor volume is defined as the sum of the volume of the reaction chamber(s) and heat exchanger chamber(s) including the volume of chamber walls;

wherein a contact time of the reactant with the catalyst is less than about 0.3 seconds;

wherein a pressure drop through the reaction chamber is less than about 15 psig; and wherein the catalyst comprises an interfacial layer on a porous support.

41. The process of claim 40 wherein said at least one reaction chamber comprises a series of different catalysts disposed within the same reaction chamber.

42. The process of claim 40 wherein the interfacial layer has a BET surface area of at least 1 m$^2$/g.

43. The process of claim 40 wherein a catalytically active material is deposited on the interfacial layer.

44. The process of claim 43 wherein the pressure drop is less than 1 psig.

45. The process of claim 40 wherein the contact time is less than 0.01 seconds.

46. The process of claim 40 wherein the at least reaction chamber and the at least one heat exchanger are separated by a web having a thickness of between 0.01 and 0.25 inches.

47. A process for the catalytic conversion of at least one reactant in a thermal chemical reaction, excluding deep oxidation, comprising:
said passing at least one reactant into at least one reaction chamber;
said reaction chamber comprising a catalyst that catalyzes the reaction of said at least one reactant;
transferring heat to or from said at least one reaction chamber from or into said at least one heat exchanger; and
obtaining at least one product from said reaction chamber;
wherein said step of transferring heat, at steady state, transfers at least 0.6 W of heat per cc of total reactor volume, such that, at steady state, the catalyst is maintained within a temperature range that reduces the formation of at least one undesirable chemical reaction product; and
wherein the catalyst comprises an interfacial layer on a porous support, and a thermal coefficient of expansion of the porous support is different from a thermal coefficient of the interfacial layer.

48. The process of claim 47 wherein a catalytically active material is deposited on the interfacial layer.

49. The process of claim 48 wherein said step of transferring heat, at steady state, transfers between 5 and 250 W/cc.

50. The process of claim 47 wherein said step of transferring heat, at steady state, transfers at least 1.0 W/cc of total reactor volume.

51. The process of claim 47 which is conducted in parallel in multiple reaction chambers, wherein each of the reaction chambers has a height less than 2 cm.

52. The process of claim 51 wherein the catalyst occupies at least 80% of the cross-sectional area of the reaction chamber.

53. The method of claim 52 wherein the at least one heat exchanger has a thickness of 250 $\mu$m to 3 mm.

54. The process of claim 51 wherein the at least one heat exchanger has a thickness of 250 $\mu$m to 3 mm.

55. A process for the catalytic conversion of at least one reactant in a thermal chemical reaction, excluding deep oxidation, comprising:
passing at least one reactant into at least one reaction chamber;
said reaction chamber comprising a catalyst that catalyzes the reaction of said at least one reactant;
transferring heat to or from said at least one reaction chamber from or into said at least one heat exchanger; and
obtaining at least one product from said reaction chamber;
wherein said step of transferring heat, at steady rate, transfers between about 10 and about 100 W/cc of total reactor volume, such that, at steady state, the catalyst is maintained within a temperature range that reduces the formation of at least one undesirable chemical reaction product.

56. A process for the catalytic conversion of at least one reactant in a thermal chemical reaction, excluding deep oxidation, comprising:
passing at least one reactant into at least one reaction chamber;
said reaction chamber comprising a porous catalyst that catalyzes the reaction of said at least one reactant;
transferring heat to or from said at least one reaction chamber from or into at least one heat exchanger; and
obtaining at least one product from said reaction chamber;
wherein said porous catalyst comprises a metal support;
wherein a contact time of the reactant is less than about 0.3 seconds, thereby suppressing slow reactions and the formation of at least one undesirable chemical reaction product; and
wherein the catalyst comprises an interfacial layer on a porous support, and a thermal coefficient of expansion of the porous support is different from a thermal coefficient of the interfacial layer.

57. The process of claim 56 wherein a catalytically active material is deposited on the interfacial layer.

58. The process of claim 56, wherein the contact time is less than 0.1 seconds.

59. The process of claim 56, wherein the contact time is less than 0.01 seconds.

60. A method for suppressing formation of at least one undesirable chemical reaction product in a thermal chemical reaction, comprising:
passing at least one reactant into at least one reaction chamber;
said reaction chamber comprising a porous catalyst that catalyzes the reaction of said at least one reactant;
transferring heat to or from said at least one reaction chamber from or into at least one heat exchanger;
obtaining at least one product from said reaction chamber; and
maintaining a contact time of the reactant at less than 0.01 seconds, thereby suppressing slow reactions and reducing the formation of at least one undesirable chemical reaction products;
wherein the catalyst comprises an interfacial layer on a porous support, and a thermal coefficient of expansion of the porous support is different from a thermal coefficient of the interfacial layer;
wherein a catalyst material is deposited on the interfacial layer; and
wherein said porous catalyst comprises a metal support.

61. A process for the catalytic conversion of at least one reactant in a thermal chemical reaction, excluding deep oxidation, comprising:
passing at least one reactant into at least one reaction chamber;
said reaction chamber comprising a catalyst that catalyzes the reaction of said at least one reactant;
transferring heat to or from said at least one reaction chamber into at least one heat exchanger; and
obtaining at least one product from said reaction chamber;
wherein said step of transferring heat, at steady state, transfers at least 0.6 W/cc of total reactor volume, where total reactor volume is defined as the sum of the volume of the reaction chamber(s) and heat exchanger chamber(s) including the volume of chamber walls;
wherein a contact time of the reactant with the catalyst is less than 0.01 seconds; and
wherein a pressure drop through the reaction chamber is less than about 15 psig.

62. A method for suppressing formation of at least one undesirable chemical reaction product in a thermal chemical reaction, comprising:

passing at least one reactant into at least one reaction chamber;

said reaction chamber comprising a porous catalyst that catalyzes the fey reaction of said at least one reactant;

transferring heat to or from said at least one reaction chamber from or into at least one heat exchanger;

obtaining at least one product from said reaction chamber;

at steady-state, transferring at least 0.6 W of heat per cc of total reactor volume, such that, at steady state, the catalyst is maintained within a temperature range that reduces the formation of at least one undesirable chemical reaction product; and maintaining a contact time of the reactant at less than 0.01 seconds, thereby suppressing slow reactions and reducing the formation of at least one undesirable chemical reaction products;

wherein said porous catalyst comprises a metal support.

63. The method of claim 62 which is conducted in parallel in multiple reaction chambers, wherein each of the reaction chambers has a height less than 2 cm.

* * * * *